United States Patent
Newcomb et al.

(10) Patent No.: US 10,308,201 B2
(45) Date of Patent: Jun. 4, 2019

(54) VEHICLE BODY STRUCTURE

(71) Applicant: GM Global Technology Operations LLC, Detroit, MI (US)

(72) Inventors: Bradley A. Newcomb, Troy, MI (US); Hamid G. Kia, Bloomfield Hills, MI (US); John C. Johnson, Macomb Township, MI (US); Robert N. Saje, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/788,240

(22) Filed: Oct. 19, 2017

(65) Prior Publication Data

US 2019/0118748 A1    Apr. 25, 2019

(51) Int. Cl.
*B60R 19/34* (2006.01)
*B62D 29/04* (2006.01)
*B62D 25/08* (2006.01)

(52) U.S. Cl.
CPC .............. *B60R 19/34* (2013.01); *B62D 25/08* (2013.01); *B62D 29/041* (2013.01); *B60Y 2410/122* (2013.01)

(58) Field of Classification Search
CPC ........ B62D 25/08; B62D 29/041; B60R 19/34
USPC ........ 296/204, 205, 184.1, 187.01; 52/783.1, 52/783.17–783.19; 293/133
See application file for complete search history.

(56) References Cited

U.S. PATENT DOCUMENTS 4,955,570 A * 9/1990 Benz ...................... B21D 47/04
248/300
4,966,082 A * 10/1990 Takeichi ............ B62D 25/2054
105/422

FOREIGN PATENT DOCUMENTS

WO    WO2008/108598    *    9/2008

* cited by examiner

*Primary Examiner* — Dennis H Pedder
(74) *Attorney, Agent, or Firm* — Cantor Colburn LLP

(57) ABSTRACT

A vehicle chassis rail includes a tubular structure and an insert, both co-extending along a centerline. The insert is disposed, at least in-part, in the tubular structure, and includes a first wall, a second wall opposed to the first wall, and a corrugated mid-wall spanning laterally between, and attached to, the first and second walls.

19 Claims, 4 Drawing Sheets

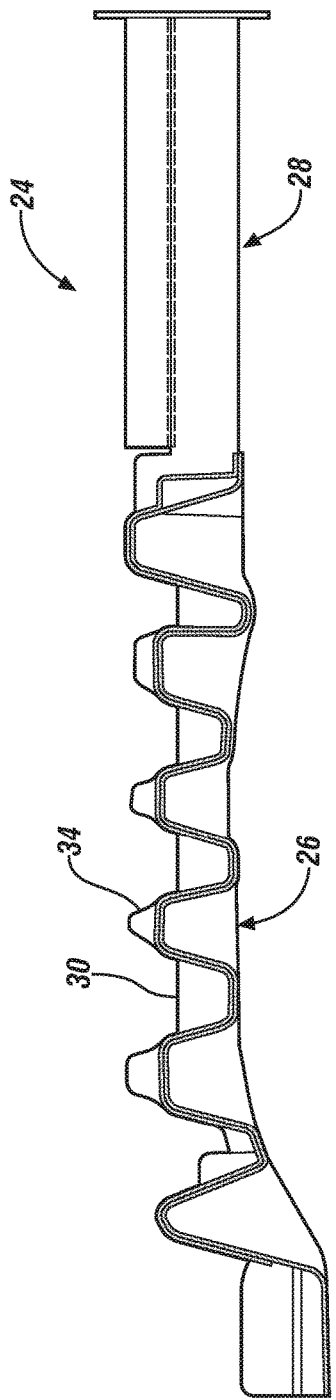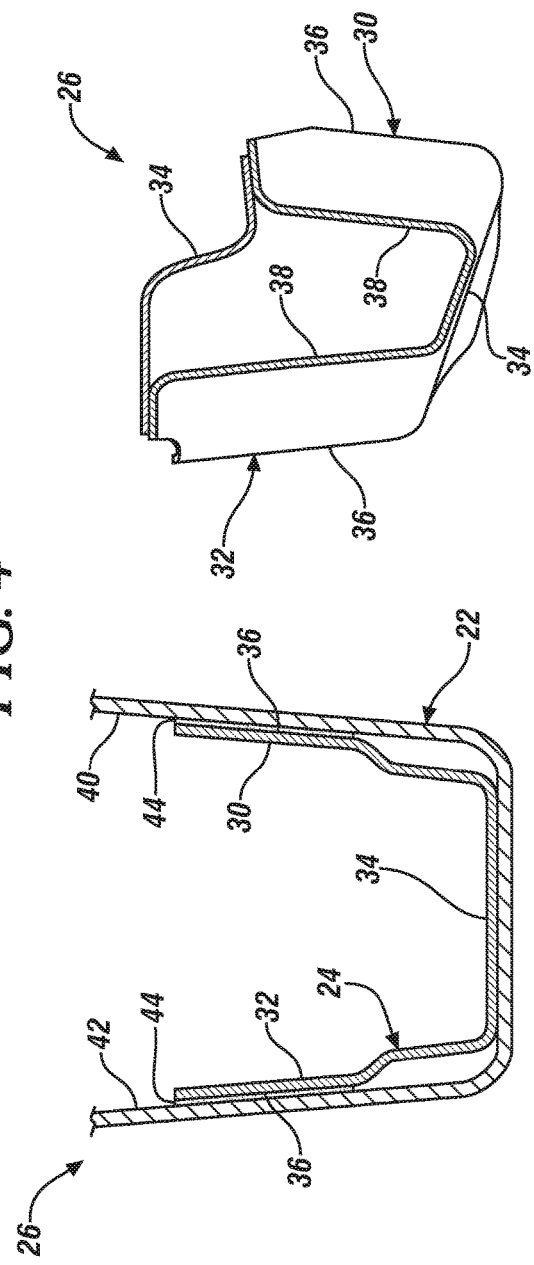

VEHICLE BODY STRUCTURE

INTRODUCTION

The subject disclosure relates to a vehicle body structure, and more particularly, to a tubular body structure including an energy absorbing insert.

Traditional vehicles chassis rails and/or tubular body structures are often made of metallic structures. In one example, the chassis rail may be a side rail that extends rearward with respect to the vehicle to engage a rear bumper. Known structures leave little room for weight savings and may limit the ability to tune energy absorption profiles.

SUMMARY

A vehicle chassis rail according to one, non-limiting, embodiment of the present disclosure includes a tubular structure and an insert. The tubular structure extends along a centerline. The insert is disposed, at least in-part, in the tubular structure. The insert includes a first wall, a second wall opposed to the first wall, and a corrugated mid-wall spanning laterally between, and attached to, the first and second walls.

Additionally to the foregoing embodiment, the first and second walls are stepped.

In the alternative or additionally thereto, in the foregoing embodiment, the first and second walls are in contact with the tubular structure.

In the alternative or additionally thereto, in the foregoing embodiment, the first and second walls each include a plurality of contact segments in contact with the tubular structure and a plurality of recessed segments spaced radially inward from the tubular structure with respect to the centerline.

In the alternative or additionally thereto, in the foregoing embodiment, the plurality of contact segments axially alternate with the plurality of recessed segments.

In the alternative or additionally thereto, in the foregoing embodiment, each one of the plurality of contact segments of the first and second walls are adhered to the tubular structure.

In the alternative or additionally thereto, in the foregoing embodiment, the first wall, the second wall, and the mid-wall are formed as one unitary piece.

In the alternative or additionally thereto, in the foregoing embodiment, the first wall, the second wall, and the mid-wall are made of a fiber reinforced composite.

In the alternative or additionally thereto, in the foregoing embodiment, a first surface of the mid-wall and the first and second walls define a first plurality of cups open in a first radial direction, and an opposite second surface of the mid-wall and the first and second walls define a second plurality of cups open in a second radial direction diametrically opposite the first radial direction.

In the alternative or additionally thereto, in the foregoing embodiment, the first and second plurality of cups alternate axially.

In the alternative or additionally thereto, in the foregoing embodiment, the insert includes an energy absorbing tail portion attached to the first wall, the second wall, and the mid-wall and projecting axially outward from an end portion of the tubular structure for engagement to a bumper.

In the alternative or additionally thereto, in the foregoing embodiment, the energy absorbing tail portion includes a first extension attached to the first wall, the second wall, and the mid-wall, and a second extension formed as a separate piece and engaged to the first extension.

In the alternative or additionally thereto, in the foregoing embodiment, the first and second extensions generally have U-shaped cross sections, and the energy absorbing tail portion has a tubular cross section.

An energy absorbing insert, according to another non-limiting embodiment, is adapted to extend between, and attach to, a tubular structure of a vehicle chassis rail and a bumper. The energy absorbing insert includes an accordion-like portion and a tail portion. The accordion-like portion is disposed inside the vehicle chassis rail and extends along a centerline. The tail portion is attached to the accordion-like portion and axially projects outward from the vehicle chassis rail for attachment to the bumper.

Additionally to the foregoing embodiment, the tail portion includes a first extension directly attached to the accordion-like portion and a second extension directly attached to the first extension.

In the alternative or additionally thereto, in the foregoing embodiment, the accordion-like portion and the first extension are made of a composite material and formed as one unitary piece.

In the alternative or additionally thereto, in the foregoing embodiment, the accordion-like portion includes a first wall, a second wall, and a corrugated mid-wall extending between and attached to the first and second walls.

In the alternative or additionally thereto, in the foregoing embodiment, the first and second walls each include a plurality of contact segments adapted to contact the tubular structure, and a plurality of recessed segments spaced radially inward from the contact segments and with respect to the centerline.

In the alternative or additionally thereto, in the foregoing embodiment, the plurality of contact segments axially alternate with the plurality of recessed segments.

In the alternative or additionally thereto, in the foregoing embodiment, a first surface of the mid-wall and the first and second walls define a first plurality of cups open in a first radial direction, and an opposite second surface of the mid-wall and the first and second walls define a second plurality of cups opened in a second radial direction that is diametrically opposite the first radial direction.

The above features and advantages and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 4 is a longitudinal cross section of the energy absorbing insert viewing in the direction of arrows 4-4 in FIG. 2;

FIG. 5 is an axial cross section of the energy absorbing insert with the tubular structure added, and viewing in the direction of arrows 5-5 in FIG. 2;

FIG. 6 is an axial cross section of the energy absorbing insert taken through contact segments of opposing walls of the energy absorbing insert, and viewing in the direction of arrows 6-6 in FIG. 2;

DETAILED DESCRIPTION

Figure 1:
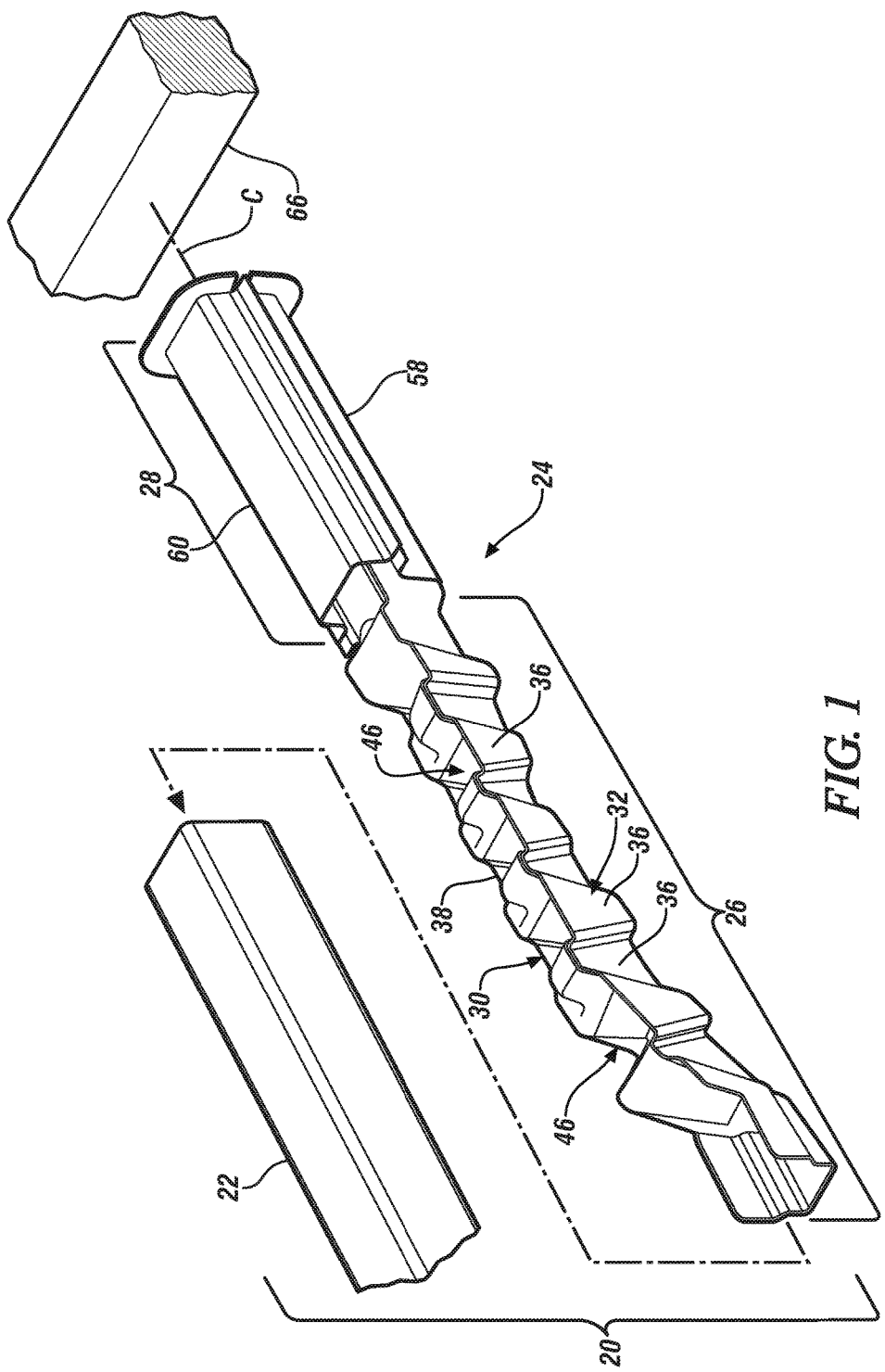
FIG. 1 is an unassembled perspective view of a vehicle chassis rail as one, non-limiting, exemplary embodiment in accordance with the present disclosure.
Figure 2:
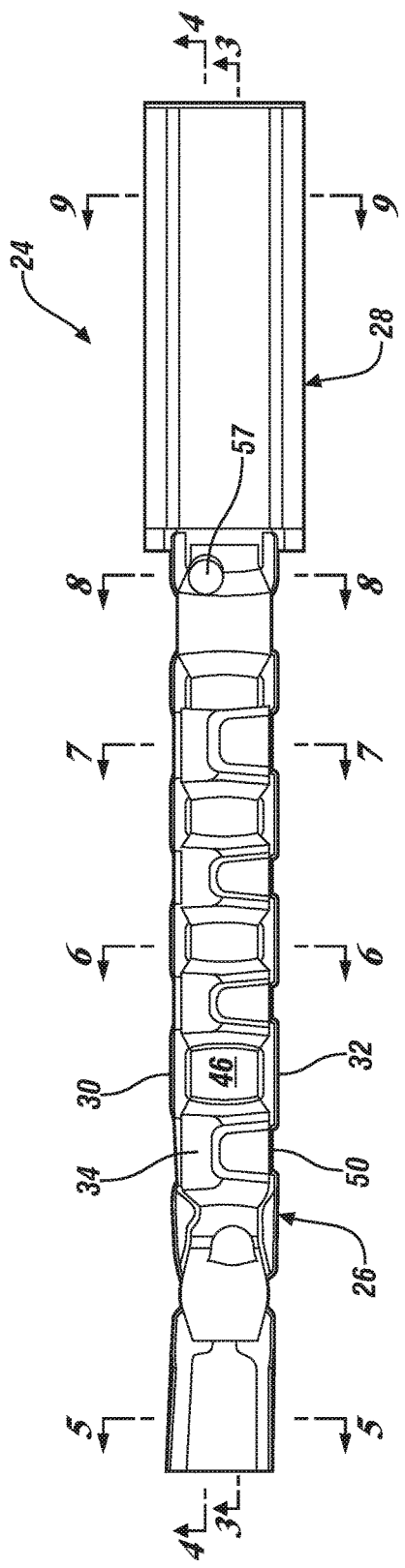
FIG. 2 is a top plan view of an energy absorbing insert of the vehicle chassis rail.
Figure 3:
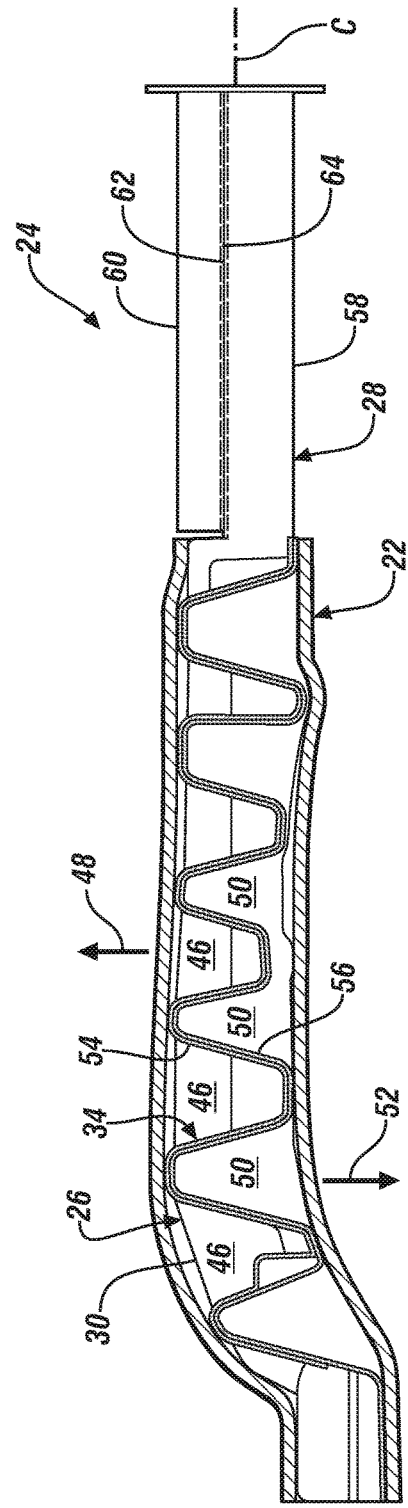
FIG. 3 is a longitudinal cross section of the energy absorbing insert with a tubular structure of the vehicle chassis rail added, and viewing in the direction of arrows 3-3 in FIG. 2.
Figure 7:
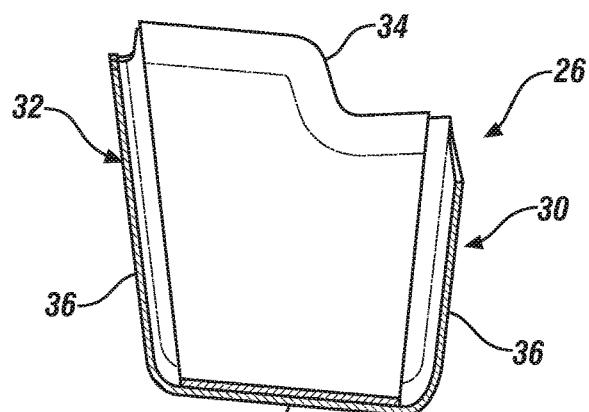
FIG. 7 is an axial cross section of the energy absorbing insert taken through recessed segments of the opposing walls of the energy absorbing insert, and viewing in the direction of arrows 7-7 in FIG. 2.

The following description is merely exemplary in nature and is not intended to limit the present disclosure, its application or uses. It should be understood that throughout the drawings, corresponding reference numerals indicate like or corresponding parts and features.

Referring to FIG. 1 and in accordance with an exemplary embodiment, a vehicle chassis rail 20 (e.g., side rails) may include a tubular structure 22 and an energy absorbing insert 24 that may attach to a bumper (not shown). The tubular structure 22 and the energy absorbing insert 24 may both be elongated and may generally co-extend along a common centerline C. The energy absorbing insert 24 may include an insert portion 26 disposed in the tubular structure 22 for providing structural rigidity and an energy absorbing tail portion 28 attached to the insert portion 26 and axially projecting outward from the tubular structure 22 to engage, for example, a vehicle bumper. The insert portion 26 may generally be accordion-like in shape, and when fully assembled, the tail portion 28 may generally be tubular. It is contemplated and understood that the energy absorbing insert 24 may simply be a structural insert and may not include the tail portion 28. As a structural insert, the insert portion 26 may be located in any tubular structure (e.g., cross rails) that are generally part of the vehicle chassis, and which may benefit from the structural traits of the insert portion 26. It is understood that the term 'vehicle chassis rail' is meant to include any vehicle body structure that may include a rail and/or tubular portion.

Referring to FIGS. 2-7, the insert portion 26 may include opposing first and second walls 30, 32 (i.e., side walls), and a mid-wall 34. The walls 30, 32 and mid-wall 34 may be elongated, extending longitudinally along the centerline C. The mid-wall 34 may be axially corrugated, and spans laterally between, and is attached to the first and second walls 30, 32. The first and second walls 30, 32 may be generally stepped, such that each wall 30, 32 includes a plurality of contact segments 36 and a plurality of recessed segments 38. The contact segments 36 and the recessed segments 38 may axially alternate with one-another. That is each contact segment 36 may be axially spaced from the next adjacent contact segment 36 by a respective recessed segment 38.

When the vehicle chassis rail 20 is fully assembled, the contact segments 36 of the first and second walls 30, 32 may be in contact with respective opposing, internal, surfaces 40, 42 of the tubular structure 22 (see FIG. 5). In one embodiment, the contact segments 36 may be adhered to the tubular structure 22 via use of a structural adhesive 44 (e.g., epoxy), and may be dependent upon the desired energy absorbing traits and structural rigidity requirements of the chassis rail 20. The recessed segments 38 of the walls 30, 32 are opposed to, and spaced radially inward from, the respective internal surfaces 40, 42 of the tubular structure 22 (see FIG. 6). It is understood and contemplated that the apexes of any number or combination of the walls 30, 32 and mid-wall 34 may contact the inner surfaces of the tubular structure 22 to provide the desired energy absorption profile and structural rigidity requirements.

Referring again to FIGS. 2 and 3, the insert portion 26 (i.e., accordion-like portion) of the energy absorbing insert 24 may define the boundaries of a first plurality of cups 46 opened in a first radial direction (see arrow 48) and a second plurality of cups 50 opened in a second radial direction (see arrow 52) that is diametrically opposite the first radial direction 48 with respect to centerline C. That is, the second cups 50 are inverted with respect to the first cups 46. In addition, the first cups 46 axially alternate with respect to the second cups 50, thus placing each one of the first cups 46 axially adjacent to respective second cups 50.

The first cups 46 of the accordion-like insert portion 26 have boundaries defined by and between the first and second walls 30, 32, and a first side 54 (see FIG. 3) of the mid-wall 34. Similarly, the second cups 50 have boundaries defined by and between the first and second walls 30, 32, and an opposite second side 56 of the mid-wall 34.

Figure 8:
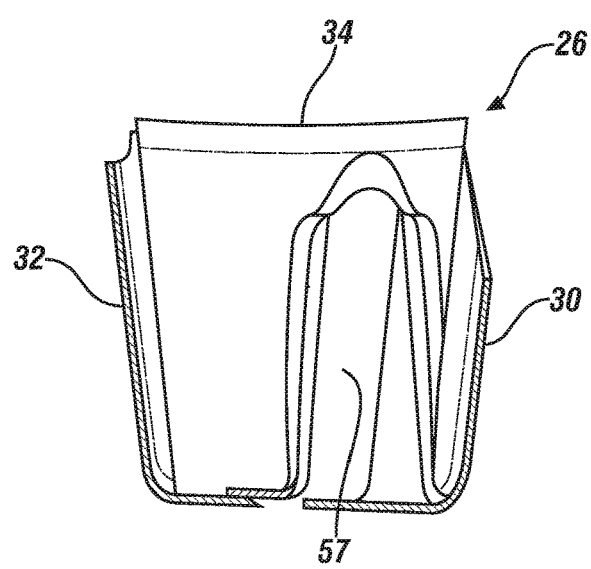
FIG. 8 is an axial cross section of the energy absorbing insert taken through a weep hole in a mid-wall of the energy absorbing insert, and viewing in the direction of arrows 8-8 in FIG. 2.

Referring again to FIGS. 2 and 8, the mid-wall 34 may include boundaries that define a weep opening 57 (i.e., hole) for drainage of liquids. Such liquids may include rain water, and/or material treatment coatings or baths during the manufacturing process of the vehicle.

Figure 9:
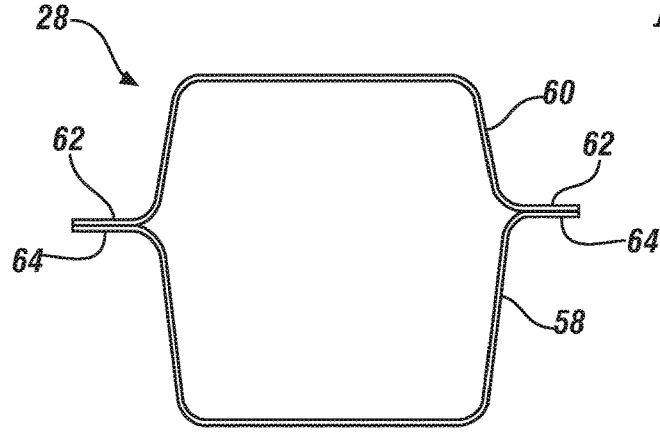
FIG. 9 is an axial cross section of the energy absorbing insert taken through a tail portion, and viewing in the direction of arrows 9-9 in FIG. 2.

Referring again to FIGS. 1, 3, and 9, the tail portion 28 may include first and second extensions 58, 60. Each extension 58, 60 (i.e., crush cans) may have a substantially U-shaped cross section with one extension being inverted with respect to the other extension. Each extension 58, 60 may include axially extending, respective, flanges 62, 64. When the tail portion 28 is assembled, the flanges 62, 64 are engaged to one-another, and, together, the extensions 58, 60 generally form a tubular tail portion 28.

The tubular structure 22 may be made of a metallic material (e.g., steel) or other non-metallic material. The accordion-like insert portion 26 combined with the first extension 58 of the tail portion 28 may be one unitary and homogeneous piece, which may be made from a polymer. Examples of a polymer may include molded thermoplastic, a thermoset, and others. Examples of molding techniques may include injection molding, resin infusion, resin transfer molding, resin injection molding, vacuum-assisted resin transfer molding, resin film infusion, compression molding, injection-compression molding, and other techniques.

Alternatively, the portion 26 and the first extension 58 may be made of a fiber reinforced composite material capable of being injected in a compression mold. In one embodiment, the fiber may be a carbon fiber. In another embodiment, the composite may be a neat polymer injection moldable material that is fiber reinforced. It is contemplated and understood that different reinforcing fibers may be used in different locations within the energy absorbing insert 24 to optimize cost and performance. It is further contemplated and understood that the second extension 60 is attached to the first extension 58 after the molding process is complete. Further, the second extension 60 may be made of the same material as the portion 26 and first extension 58.

The insert portion 26 may be made of an injection moldable material while the energy absorbing tail portion 28 may be made of a compression moldable material in a single step molding process. In this case, the resin material of the insert portion 26 and tail portion 28 may be the same. However, the reinforcing fiber may be different. For instance, the insert portion 26 may be a glass reinforced injection moldable material (e.g., glass fiber reinforced nylon), and the tail portion 28 may be a carbon fiber reinforced compression moldable material (e.g., carbon fiber reinforced nylon). Other examples of reinforcing fibers may include carbon fibers, glass fibers, aramid fibers, polyethylene fibers, organic fibers, metallic fibers, and combinations thereof.

In another embodiment, the insert portion 26 and the energy absorbing tail portion 28 may be made of a fiber reinforcement thermoset material in a single step molding process. In this case, the resin material of the insert portion 26 and tail portion 28 may be the same. However, the reinforcing fiber may be different. For instance, the insert portion 26 may be a glass reinforced resin-infusion material (e.g., glass fiber reinforced epoxy), and the tail portion 28 may be a carbon fiber reinforced resin-infusion material (e.g., carbon fiber reinforced epoxy). Other examples of reinforcing fibers may include carbon fibers, glass fibers, aramid fibers, polyethylene fibers, organic fibers, metallic fibers, and combinations thereof, with the potential to utilize fiber-hybrids in both the insert portion 26 and energy absorbing tail portion 28.

The cross section of the energy absorbing tail portion 28 may be larger than the cross section of the tubular structure 22. In this way, axial insertion of the accordion-like insert portion 26 into the tubular structure 22 during assembly of the chassis rail 20 may be conveniently repeatable. In operation, and in an application where an end portion (i.e., which may be distal) of the energy absorbing tail portion 28 is attached to a rear bumper 66 (see FIG. 1), a rear impact may cause the energy absorbing tail portion 28 to collapse axially and/or absorb the impact energy. The accordion-like insert portion 26 provides additional structural strength for the tubular structure 22, and may generally replace more traditional steel reinforcements for known tubular structures 22. The design and/or geometry of the energy absorbing tail portion 28 may be changed (i.e., fine-tuned) to achieve a desired energy absorption profile. It is contemplated and understood that upon an impact scenario the composite tail portion 28 may be designed for any one or more of failure modes that may or may not include axial collapse. For example, the failure modes may include tearing, fronding, inter-laminar failure, intra-laminar failure, fiber/matrix de-bonding, local buckling, fragmentation, and others. Such failure modes may further depend on whether the impact is in a substantially axial or forward direction, or from some other angle, as well as upon the chosen material used within the structure.

Advantages and benefits of the present disclosure include a reduction in mass and the ability to fine-tune an energy absorption profile of a vehicle chassis. Other advantages may include a robust design and a reduction in manufacturing costs associated with fabricating, checking, and assembling parts.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle chassis rail comprising:
    a tubular structure extending along a centerline; and
    an insert disposed at least in-part in the tubular structure, the insert including a first wall, a second wall opposed to the first wall, and a corrugated mid-wall spanning laterally between and attached to the first and second walls, wherein the insert includes an energy absorbing tail portion attached to the first wall, the second wall, and the mid-wall and projecting axially outward from an end portion of the tubular structure for engagement to a bumper.

2. The vehicle chassis rail set forth in claim 1, wherein the first and second walls are stepped.

3. The vehicle chassis rail set forth in claim 1, wherein the first and second walls are in contact with the tubular structure.

4. The vehicle chassis rail set forth in claim 3, wherein the first and second walls each include a plurality of contact segments in contact with the tubular structure and a plurality of recessed segments spaced radially inward from the tubular structure with respect to the centerline.

5. The vehicle chassis rail set forth in claim 4, wherein the plurality of contact segments axially alternate with the plurality of recessed segments.

6. The vehicle chassis rail set forth in claim 5, wherein each one of the plurality of contact segments of the first and second walls are adhered to the tubular structure.

7. The vehicle chassis rail set forth in claim 1, wherein the first wall, the second wall, and the mid-wall are formed as one unitary piece.

8. The vehicle chassis rail set forth in claim 7, wherein the first wall, the second wall, and the mid-wall are made of a fiber reinforced composite.

9. The vehicle chassis rail set forth in claim 1, wherein a first surface of the mid-wall and the first and second walls define a first plurality of cups open in a first radial direction, and an opposite second surface of the mid-wall and the first and second walls define a second plurality of cups open in a second radial direction diametrically opposite the first radial direction.

10. The vehicle chassis rail set forth in claim 9, wherein the first and second plurality of cups alternate axially.

11. The vehicle chassis rail set forth in claim 1, wherein the energy absorbing tail portion includes a first extension attached to the first wall, the second wall, and the mid-wall, and a second extension formed as a separate piece and engaged to the first extension.

12. The vehicle chassis rail set forth in claim 11, wherein the first and second extensions generally have U-shaped cross sections, and the energy absorbing tail portion has a tubular cross section.

13. An energy absorbing insert adapted to extend between and attach to a tubular structure of a vehicle chassis rail and a bumper, the energy absorbing insert comprising:
    an accordion-like portion disposed inside the vehicle chassis rail and extending along a centerline; and
    a tail portion attached to the accordion-like portion and axially projecting outward from the vehicle chassis rail for attachment to the bumper.

14. The energy absorbing insert set forth in claim 13, wherein the tail portion includes a first extension directly attached to the accordion-like portion and a second extension directly attached to the first extension.

15. The energy absorbing insert set forth in claim 14, wherein the accordion-like portion and the first extension are made of a composite material and formed as one unitary piece.

16. The energy absorbing insert set forth in claim 13, wherein the accordion-like portion includes a first wall, a second wall, and a corrugated mid-wall extending between and attached to the first and second walls.

17. The energy absorbing insert set forth in claim 16, wherein the first and second walls each include a plurality of contact segments adapted to contact the tubular structure, and a plurality of recessed segments spaced radially inward from the contact segments and with respect to the centerline.

18. The energy absorbing insert set forth in claim 17, wherein the plurality of contact segments axially alternate with the plurality of recessed segments.

19. The vehicle chassis rail set forth in claim 18, wherein a first surface of the mid-wall and the first and second walls define a first plurality of cups open in a first radial direction, and an opposite second surface of the mid-wall and the first and second walls define a second plurality of cups opened in a second radial direction that is diametrically opposite the first radial direction.

* * * * *